March 9, 1948.　　　　　D. DALIN　　　　　2,437,294
DUST SEPARATOR
Filed Sept. 30, 1943　　　　2 Sheets-Sheet 2
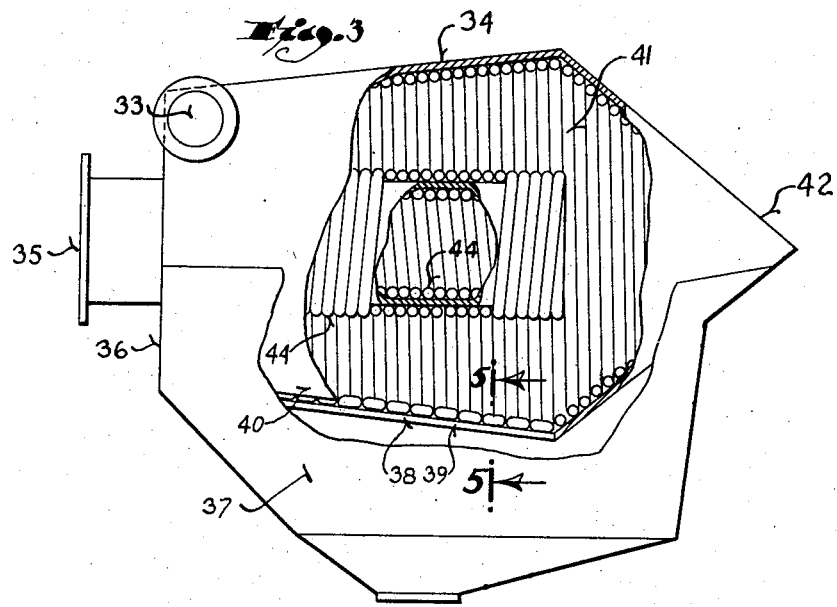
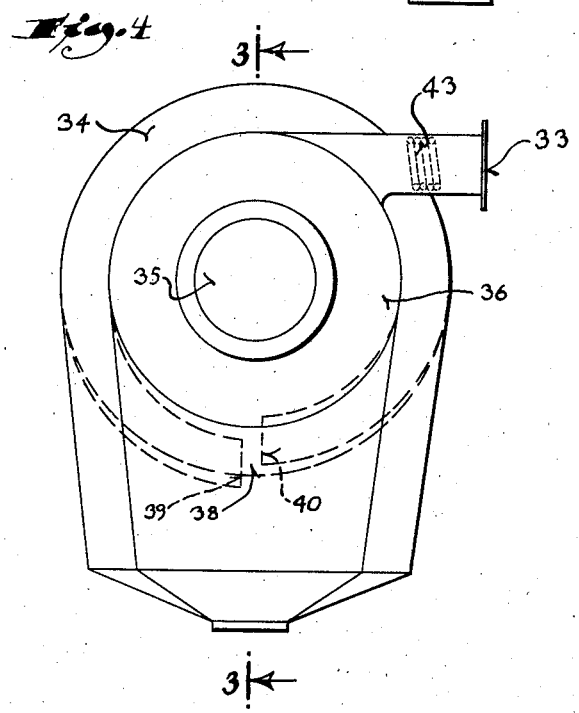
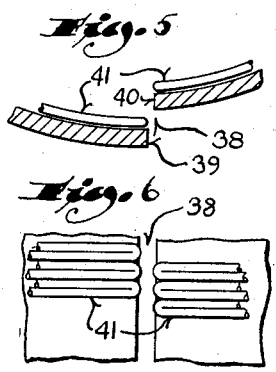
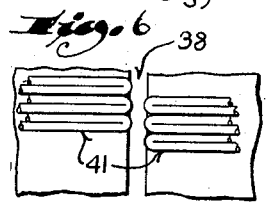
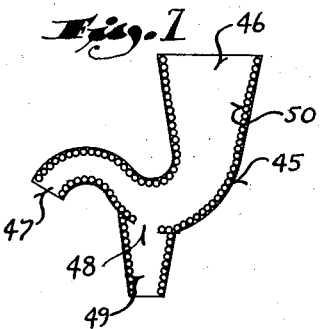
Inventor
David Dalin Patented Mar. 9, 1948

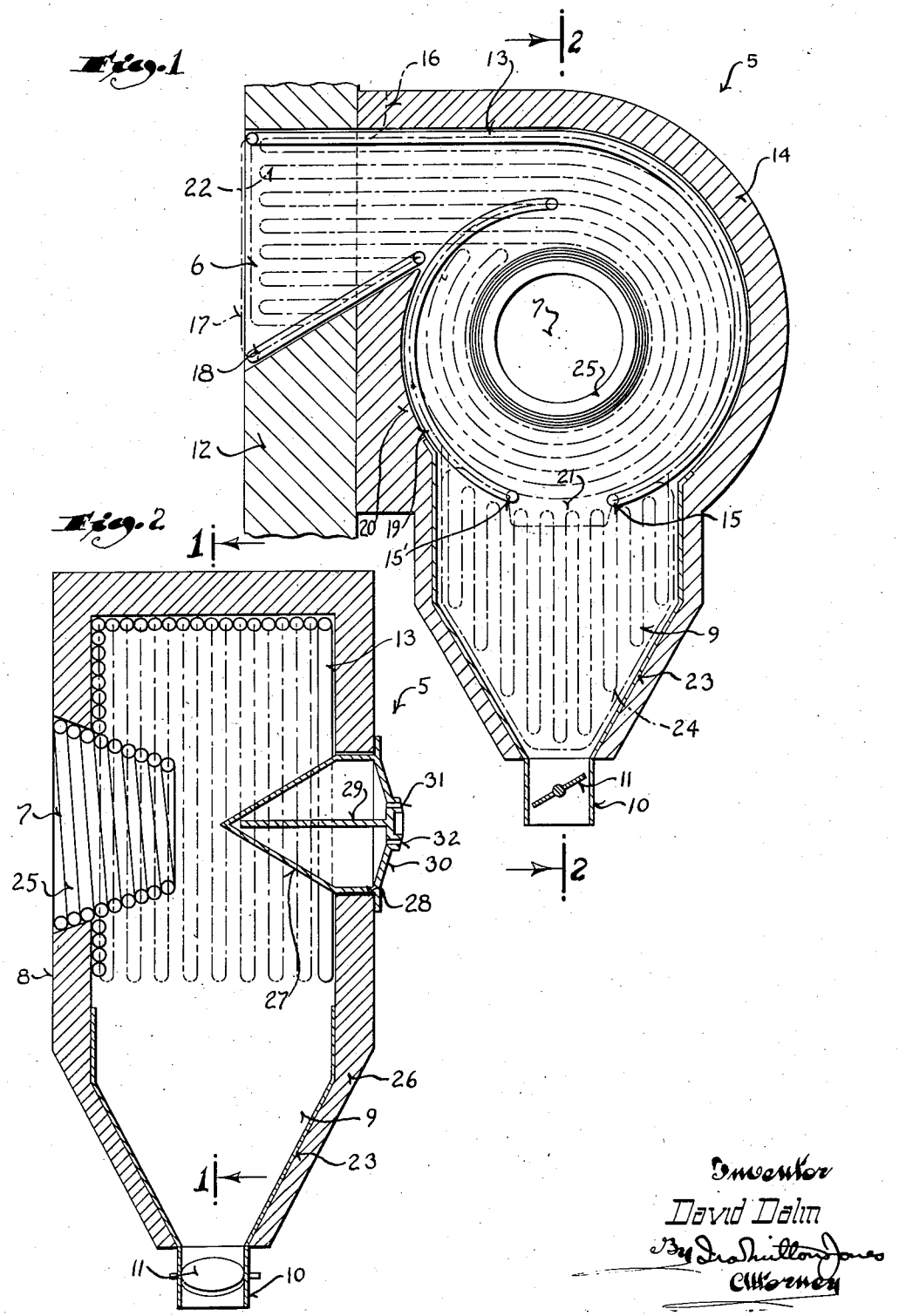

2,437,294

UNITED STATES PATENT OFFICE 2,437,294

DUST SEPARATOR

David Dalin, Sodertalje, Sweden

Application September 30, 1943, Serial No. 504,339
In Sweden September 8, 1942

Sections 1 and 3, Public Law 690, August 8, 1946
Patent expires September 8, 1962

9 Claims. (Cl. 183—32)

This invention relates to improvements in dust separators and refers more particularly to separators designed for the purpose of separating solid particles from hot gases. The invention applies especially to such known devices, where the gases are caused to flow around the inside of a drum which may be round, spiral-shaped or of any other suitable shape and where the gases are forced to follow the shape of the drum, but in which the gases continually change their direction of flow. Openings are usually placed in the peripheral wall of this drum or separator chamber so positioned that when the gas passes these openings the solid particles entrained in the gas are thrown out through said openings by centrifugal force to be collected in a dust collecting chamber.

This invention finds particular application in cases where the gases are of such high temperature that materials such as mild steel, or which separators are ordinarily made, will be damaged by the high temperature of the gases.

To this end it is an object of this invention to provide a novel manner of protecting the walls of the separator and all parts thereof ordinarily subjected to the high temperature of the gases, through the use of fluid cooled coils or ducts.

Another object of this invention is to so arrange the fluid cooled coils or ducts that they alone form important walls of the separator.

Another object of this invention is to employ fluid cooled coils arranged in a particular fashion to define a baffled outlet for the unburdened gases.

Still another object of this invention is to so dispose the fluid cooled coils or ducts as to define the discharge port through which the separated solid particles enter the collecting hopper or compartment.

A further object of this invention is to so arrange the edges of the discharge port for the separated solids with relation to the flow of the gases as to facilitate the discharge of the solids.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindescribed invention may be made as come within the scope of the claims.

The accompanying drawings illustrate several complete examples of the physical embodiment of the invention constructed in accordance with the best modes so far devised for the practical application of the principles thereof, and in which:

Figure 1 is a vertical sectional view through a centrifugal type dust separator illustrating one embodiment of this invention, said view being taken on the plane of the line 1—1 of Figure 2;

Figure 2 is a vertical sectional view through the separator shown in Figure 1, said view being taken on the plane of the line 2—2 of Figure 1;

Figure 3 is a side elevation, with parts broken away and in section, of a dust separator of the cyclone type, illustrating another form of this invention, said view being taken on the plane of the line 3—3 in Figure 4;

Figure 4 is an end view of the separator shown in Figure 3;

Figure 5 is a detail sectional view taken on the plane of the line 5—5 in Figure 3;

Figure 6 is a fragmentary top view of the particular structure shown in Figure 5; and Figure 7 is a vertical sectional view through still another form of dust separator embodying this invention.

Referring now particularly to the accompanying drawings, in which like numerals indicate like parts, the numeral 5 designates generally a spiral shaped diffuser housing or chamber having an inlet 6 for air and gases which may be burdened with solid particles of extraneous matter and an outlet 7 for the cleaned or unburdened air or gases. The inlet 6 opens tangentially to the diffuser housing or chamber and the outlet 7 is positioned axially thereof through one side wall 8.

The bottom of the diffuser housing or chamber opens to a collecting hopper or compartment 9 in which the solid particles separated from the air or gases accumulate. This collecting hopper or compartment is preferably funnel shaped and has an outlet 10 in its bottom controlled by a damper 11.

The main supporting walls of the diffuser housing or chamber as well as the collecting hopper may be of any suitable material, but where the separator is to be used in conjunction with heat generating devices of various types, such as blast furnaces, forges, sulphite and sulphate plants for paper pulp manufacturers, cement mills, drying mills, steam boilers, and all kinds of hot, dust laden gases, it is preferable that these walls be of masonry construction.

In such instances it is also desirable to mount the diffuser housing directly adjacent to one wall 12 of the combustion chamber or other source from which the gases issue.

It is desirable to have the inside walls of the separator lined, but the extremely hot gases to be handled makes ordinary lining expedients unsatisfactory. Thus, the inner walls of the separator contacted by the hot gases are covered by layers or banks of fluid cooled tubes or ducts. One bank or set 13 of these fluid cooled tubes consists of coils shaped to overlie the peripheral wall 14 of the diffuser housing or chamber opposite the inlet opening, extending solidly over the entire surface thereof.

As shown, these coils begin at the inlet 6 and follow the wall 14 to its juncture with the collecting hopper or compartment 9 where they continue with the same curvature a substantial distance therebeyond to terminate as at 15 on a transverse line spaced a short distance from a vertical plane passing through the axis of the outlet 7 and the collecting hopper 9. At this point 15 the coils reverse themselves and continue back to the inlet where they have another hairpin turn to continue back to the point 15, serpentine fashion back and forth, until the entire area of the wall 14 is covered.

The inlet of the bank of coils 13 may be through the top of the diffuser housing as indicated by the center line 16. The opposite end of this bank of coils is connected by a bridging duct indicated by the center line 17, with a bank of coils 18 which overlies the bottom wall of the inlet 6 and connects with the arched bank of coils 19 covering the adjacent near curved wall 20 of the diffuser housing or chamber.

The bank of coils 19, like the coils 13, terminates as at 15' on a transverse line spaced a short distance from the vertical plane passing through the axis of the outlet 7 and through the collecting hopper 9. These termini 15 and 15' of the respective coil banks 13 and 19 thus define the discharge port 21 through which the solid particles entrained in the hot gases leave the diffuser housing or chamber to enter the collecting hopper or compartment 9.

The flat side walls of the diffuser housing are also covered by banks of fluid cooled tubes indicated by the center lines 22. The specific arrangement of the coils is, of course, subject to modification and the arrangement shown is but illustrative, it being important only that the coils be compactly arranged to adequately cover and protect the masonry walls of the diffuser housing or chamber which are directly contacted by the hot gases.

The collecting hopper or compartment 9 preferably has its walls lined with plate 23 of which the outlet 10 is formed, but this plate lining is preferably protected by fluid cooled coils indicated by the center lines 24.

The outlet 7 is defined by a conically spiral coil 25 which projects a substantial distance into the interior of the diffuser housing or chamber as shown in Figure 2. This formation produces a baffle to deflect solid particles entrained by the hot gases from passing out through the outlet 7.

To further assure against the passage of solid particles out with the discharging gases, the opposite side wall 26 of the diffuser housing or chamber has an inwardly directed conical protrusion 27 mounted thereon. This protrusion is on the axis of the outlet 7 and causes such solid particles as have a tendency to follow along with the gas stream toward the outlet 7 to be thrown outwardly toward the periphery of the diffuser housing. While this inward protrusion can be formed of fluid cooled coils like the conical outlet passage 25, it is preferably formed of plate construction, being built up as a unit and inserted into the wall 26 through a hole 28 therein.

The protrusion 27 is hollow and has a partition 29 extending down the center thereof joined to its head wall 30 but spaced from the apex of the protrusion. Hence, a cooling medium entering a port 31 in the head wall and leaving a port 32 therein is caused to circulate through the conical protrusion and keep the same cool.

In the dust separator illustrated in Figures 3 and 4 the dust laden or burdened air enters an inlet 33 disposed tangentially with respect to a substantially cylindrical or slightly conical diffuser housing 34. A cylindrical duct 35 passing through and secured to an end wall 36 of the housing with the inner end thereof projecting a substantial distance into the housing provides the outlet.

Beneath the diffuser housing is a dust collecting hopper 37 connected with the interior of the diffuser housing by an elongated slit 38. This slit 38, as clearly shown in Figures 4 and 5, has its edges offset radially with its edge 39 which is nearest the inlet 33 from the standpoint of direction of flow, disposed farther outward than the opposite edge 40. This arrangement facilitates the discharge of the solid particles into the collecting hopper 37.

The entire internal surface of the diffuser housing is covered by coils of fluid cooled tubes 41 which preferably extend into the conical end 42 of the diffuser housing. The inlet 33 is protected by coils 43 and the outlet duct 35 is protected by fluid cooled coils 44 disposed on the inside and outside thereof.

Attention is directed to the fact that the coils 41 which lie in the substantially cylindrical or gently conical wall of the diffuser housing chamber 34 terminate adjacent to the edges 39 and 40 of the slit 38. In fact, it is the termini of these coils at these edges which define the actual slit opening 38.

In that embodiment of the invention illustrated in Figure 7 the separator chamber or diffuser housing is formed as a double curved tube 45 of progressively smaller cross section. The dust laden air or gas enters this tube through the inlet opening 46 and leaves the same through the outlet opening 47. Directly after the first curve the lower portion of the tube has a discharge port 48 through which the solid particles pass into a collecting chamber 49.

In passing the discharge port 48 the gas or air changes direction with the curvature of the pipe 45, escaping through the outlet 47, while the solid particles due to their inertia continue in a line tangent to the curvature of the pipe wall immediately ahead of the port 48 to pass out through this port.

To protect the inner walls of the pipe 45 as well as the collecting chamber 49 fluid cooled coils 50 cover these walls. These coils can be arranged in any desired manner, either lengthwise or crosswise with the relation to the direction of gas flow.

From the foregoing description, taken in connection with the accompanying drawings, it will be readily apparent to those skilled in the art that this invention provides a dust separator especially well adapted for use in installations where the gases to be handled are extremely hot and that this invention provides a practical solution for the problem thus presented.

Having described my invention what I claim as new and desire to protect by Letters Patent is:

1. A centrifugal type dust separator for separating solid particles from extremely hot gases comprising: a chamber having an inlet for the hot burdened gases, an outlet for the unburdened gases, and a collecting compartment for the solid particles separated from the gases, said chamber being shaped so as to impart abrupt changes in the direction of flow of the gases therethrough so that the solid particles entrained by the gases are separated therefrom by the inertia of the moving particles; and a substantially imperforate protective covering for the inner walls of the separator for substantially precluding contact of the hot gases with the separator walls during passage of the gases through the separator, said protective covering comprising a series of closely adjacent fluid passages through which a coolant is circulated.

2. A centrifugal type dust separator for separating solid particles from extremely hot gases comprising: a chamber having an inlet for the hot burdened gases, an outlet for the unburdened gases, and a collecting compartment for the solid particles separated from the gases, said chamber being shaped so as to impart abrupt changes in the direction of flow of the gases therethrough so that the solid particles entrained by the gases are separated therefrom by the inertia of the moving solid particles; and a protective covering for the inner walls of the separator comprising a plurality of closely adjacent serpentine coils disposed to provide an imperforate lining for the walls of the separator which they overlie so as to guide the gases through the separator, and through which a coolant is circulated.

3. A centrifugal type dust separator for separating solid particles from extremely hot gases comprising: a chamber having an inlet for the hot burdened gases, an outlet for the unburdened gases, and a collecting compartment for the solid particles separated from the gases, said chamber being shaped so as to impart abrupt changes in the direction of flow of the gases therethrough so that the solid particles entrained by the gases are separated therefrom by the inertia of the moving solid particles; and banks of cooling coils providing a substantially imperforate lining for the walls of the separator chamber and forming the lip of the mouth to the collecting compartment over which the solid particles slide to reach the collecting compartment, said coils being adapted to have a coolant circulated therethrough.

4. A centrifugal type dust separator for separating solid particles from extremely hot gases comprising: a chamber having a substantially circular body portion with an inlet leading tangentially thereto and an outlet leading substantially axially therefrom so that hot gases having solid particles entrained therein and entering the tangential inlet swirl around the outlet before reaching the same, whereby the solid particles entrained in the gases are thrown outwardly by centrifugal force; banks of fluid cooled coils solidly covering the inner surfaces of said chamber, its inlet and outlet, to preclude contact of the extremely hot gases with the walls of the chamber, the coils covering the circular walls of the chamber being interrupted at the bottom of the chamber to provide an outlet for the solid particles separated from the hot gases; and a collecting compartment beneath said opening to receive the solid particles separated from the gases.

5. A centrifugal type dust separator for separating solid particles from extremely hot gases comprising: a substantially cylindrical like chamber having an inlet opening tangentially thereto through which burdened hot gases enter the chamber, and an outlet substantially axially disposed and passing through one side wall of the chamber; substantially solid banks of fluid cooled coils overlying the curved walls of the chamber to completely cover and protect the same, one bank of said coils extending continuously from the inlet and tangentially following the far side curved wall of the chamber and terminating at a point near a vertical plane passing through the axis of the outlet, another bank of said cooling coils completely covering the curved wall of the chamber nearest the inlet from a point adjacent to the inlet to a point spaced from the termination of said other bank of coils, so as to define a discharge port at the bottom of the chamber through which solid particles separated from the gases pass; and a collecting hopper beneath said discharge port to receive the solid particles.

6. A centrifugal type dust separator for separating solid particles from extremely hot gases comprising: a substantially cylindrical like chamber having an inlet opening tangentially thereto through which burdened hot gases enter the chamber, and an outlet substantially axially disposed and passing through one side wall of the chamber; substantially solid banks of fluid cooled coils overlying the curved walls of the chamber to completely cover and protect the same against contact by the hot gases, one bank of said coils extending continuously along the top of the inlet and tangentially following the far side curved wall of the chamber and terminating at a point near a vertical plane passing through the axis of the outlet, another bank of said cooling coils completely covering the curved wall of the chamber nearest the inlet from a point adjacent to the inlet to a point spaced from the termination of said other bank of coils, so as to define a discharge port at the bottom of the chamber through which solid particles separated from the gases may pass; a collecting hopper beneath said discharge port to receive the solid particles; and a bank of fluid cooled coils completely covering and protecting the bottom wall of the inlet and tangentially meeting the second designated bank of coils, said coils serving to guide the flow of gases through the separator.

7. A centrifugal type dust separator for separating solid particles from extremely hot gases comprising: a substantially cylindrical chamber having an inlet for the hot burdened gases opening tangentially thereto, and an outlet for unburdened gases disposed substantially axially and through one side wall of the chamber; fluid cooled ducts providing a substantially imperforate lining for the walls of the chamber and the inlet to protect the walls thereof from contact with the extremely hot gases, said fluid cooled ducts being interrupted at the bottom of the chamber to define a discharge port for the solid particles separated from the hot gases; and an outwardly expanding conical spiral of cooling coils disposed in the outlet of the chamber with its small diameter end projecting a substantial distance into the chamber and providing a discharge port for the unburdened hot gases having substantially imperforate sides to cause the hot burdened gases entering the chamber to swirl around said coil before entering the outlet passage defined thereby.

8. A centrifugal type dust separator for separating solid particles from extremely hot gases comprising: a substantially cylindrical chamber having an inlet for the hot burdened gases opening tangentially thereto, and an outlet for unburdened gases disposed substantially axially and through one side wall of the chamber; fluid cooled ducts providing a substantially imperforate lining for the walls of the chamber and the inlet to protect the walls thereof from contact with the extremely hot gases, said fluid cooled ducts being interrupted at the bottom of the chamber to define a discharge port for the solid particles separated from the hot gases; an outwardly expanding conical spiral of fluid cooled tightly wrapped coils disposed in the outlet of the chamber with its small diameter end projecting a substantial distance into the chamber and providing a discharge port for the unburdened hot gases having substantially imperforate sides to cause the hot burdened gases entering the chamber to swirl around said coil before entering the outlet passage defined thereby; and a substantially conical shaped inward protrusion on the side wall of the chamber opposite said coil to cooperate with said coil in insuring separation of the solid particles from the gases before they leave the chamber through the outlet.

9. A centrifugal type dust separator for separating solid particles from extremely hot gases comprising: a substantially cylindrical chamber having an inlet for the hot burdened gases opening tangentially thereto, and an outlet for unburdened gases disposed substantially axially and through one side wall of the chamber; fluid cooled ducts providing a substantially imperforate lining for the walls of the chamber and the inlet to protect the walls thereof from contact with the extremely hot gases, said fluid cooled ducts being interrupted at the bottom of the chamber to define a discharge port for the solid particles separated from the hot gases; an outwardly expanding conical spiral of fluid cooled tightly wrapped coils disposed in the outlet of the chamber with its small diameter end projecting a substantial distance into the chamber and providing a discharge port for the unburdened hot gases having substantially imperforate sides to cause the hot burdened gases entering the chamber to swirl around said coil before entering the outlet passage defined thereby; a substantially conical shaped inward protrusion on the side wall of the chamber opposite said coil to cooperate with said coil in insuring separation of the solid particles from the gases before they leave the chamber through the outlet, said protrusion being hollow; and means for circulating a coolant therethrough.

DAVID DALIN.

REFERENCES CITED

The following references are of record in the file of this patent:

UNITED STATES PATENTS

| Number | Name | Date |
|---|---|---|
| 1,230,581 | Johnson | June 19, 1917 |
| 1,665,434 | Bennett | Apr. 10, 1928 |
| 1,822,221 | Jones | Sept. 8, 1931 |
| 1,912,381 | Meston | June 6, 1933 |
| 2,323,405 | Lindroth | July 6, 1943 |

FOREIGN PATENTS

| Number | Country | Date |
|---|---|---|
| 55,275 | Australia | Sept. 10, 1912 |
| 465,897 | Great Britain | May 14, 1937 |